United States Patent
Thompson et al.

(10) Patent No.: US 9,556,976 B1
(45) Date of Patent: Jan. 31, 2017

(54) CABLE GUIDE FOR WIRE BASKET CABLE TRAY

(71) Applicant: Cooper Technologies Company, Houston, TX (US)

(72) Inventors: Stephen Nathaniel Thompson, Edwardsville, IL (US); Travis Cole Shelton, Edwardsville, IL (US); Mohan Ravilla, Srikalahasti (IN)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/809,692

(22) Filed: Jul. 27, 2015

(51) Int. Cl.
*H02G 3/04* (2006.01)
*H02G 3/06* (2006.01)
*H02G 1/06* (2006.01)
*G02B 6/00* (2006.01)
*G02B 6/46* (2006.01)
*F16L 3/26* (2006.01)
*F16L 3/22* (2006.01)
*F16L 3/06* (2006.01)
*G02B 6/44* (2006.01)
*H02G 1/08* (2006.01)

(52) U.S. Cl.
CPC .. *F16L 3/26* (2013.01); *F16L 3/06* (2013.01); *F16L 3/22* (2013.01); *G02B 6/4459* (2013.01); *H02G 1/08* (2013.01); *H02G 3/0406* (2013.01)

(58) Field of Classification Search
CPC .............. H02G 1/08; H02G 3/04; H02G 3/30; H02G 3/0406; H02G 3/06; G02B 6/4459
USPC .......... 248/49, 55, 65, 68.1, 75, 80, 89, 154; 385/136, 147; 254/395, 396; 242/615.2; 52/124, 126
See application file for complete search history.

(56) References Cited

U.S. PATENT DOCUMENTS

| | | | |
|---|---|---|---|
| 3,249,337 A | 5/1966 | Neumann | |
| 3,637,175 A | 1/1972 | McElroy | |
| 5,203,526 A * | 4/1993 | Green | B05B 15/00 248/156 |
| 5,809,733 A * | 9/1998 | Venegas, Jr. | E01F 15/003 256/13.1 |
| 6,076,315 A | 6/2000 | Kondo | |
| 6,109,561 A | 8/2000 | Haines | |
| 6,708,918 B2 | 3/2004 | Ferris et al. | |
| 6,729,606 B1 * | 5/2004 | Durin | B65H 57/14 242/615.2 |

(Continued)

OTHER PUBLICATIONS

Cooper B-Line, Flextray™ It's Simple Cable Management Catalog & Product Installation Guide, 2010, p. 43, Houston, Texas.

(Continued)

*Primary Examiner* — Tan Le
(74) *Attorney, Agent, or Firm* — Senniger Powers LLP

(57) ABSTRACT

A guide body for a cable guide includes a stem having an upper end, a lower end, and a longitudinal axis extending between the upper and lower ends, and base adjacent the lower end of the stem. The guide body is rotatable about the longitudinal axis of the stem to configure the base from an unlocked orientation relative to the wire basket cable tray, in which the base is receivable in and removable from a floor opening of a wire basket cable tray, and a locked orientation relative to the wire basket cable tray, in which the base is secured to the wire basket cable tray in the floor opening. A snap-fit component attaches a roller retainer to a stem body by snap-fit connection when a roller is received on the stem body to retain the roller on the stem body.

19 Claims, 13 Drawing Sheets

(56) References Cited

U.S. PATENT DOCUMENTS

| | | | | |
|---|---|---|---|---|
| 7,130,521 | B2 * | 10/2006 | McCrary | G02B 6/4459 |
| | | | | 254/390 |
| 7,621,487 | B2 * | 11/2009 | Brown | F16L 3/24 |
| | | | | 248/65 |
| 7,770,344 | B2 * | 8/2010 | Betz | H02G 3/0443 |
| | | | | 52/126.6 |
| 7,826,707 | B2 | 11/2010 | Cassidy et al. | |
| 8,958,681 | B2 | 2/2015 | Ripplinger | |
| 2007/0164174 | A1 * | 7/2007 | Hung | A47B 87/0215 |
| | | | | 248/159 |

OTHER PUBLICATIONS

WBT LLC, Performance CableTray™, catalog, May 2015, p. 17, Centralia, Illinois.

* cited by examiner

CABLE GUIDE FOR WIRE BASKET CABLE TRAY

FIELD OF THE DISCLOSURE

The present disclosure generally relates to a cable guide for a wire basket cable tray.

BACKGROUND OF THE DISCLOSURE

Cable support systems featuring trays are known for supporting a network of cables below raised floors or above hung ceilings and in other areas where cable networks are located. The conventional cable tray system is made up of a large number of trays positioned end to end along a desired route where cables are to be placed and supported. The cable trays, in turn, are supported by a number of brackets or hangers mounted on support shafts (such as sub-floor support shafts holding up a raised floor), walls, ceilings, floors or other building structures. The trays are connected to each other by clips or clamps. One type of cable tray is a wire basket cable tray. The wire basket cable tray comprises a plurality of spaced apart longitudinal wires secured (e.g., welded) to a plurality of spaced apart transverse wires.

Corners or turns along the cable route or pathway defined by the cable trays make installation of cables difficult. More specifically, a cable must be carefully guided by hand around corners and turns during installation as there is a risk of snapping or damaging the cable against the sides or edges of the wire basket cable trays that form the corner of the turn or surrounding support brackets or hangers. The cables may also become tangled if not kept aligned with the route of the trays. In addition, many of the low voltage cables installed in the cable trays have specific bend radius requirements (3× and 10× bend radius versus the cable diameter). In this case, the requirement is to avoid a 90 degree corner. In response to this issue, cable guide devices exist for maintaining cable alignment with the trays at turns in the tray route.

SUMMARY OF THE DISCLOSURE

In one aspect, a cable guide for a wire basket cable tray including adjacent longitudinal wires secured to adjacent and transverse wires to define a floor opening in a floor of the wire basket cable tray, generally comprises a guide body including a stem having an upper end, a lower end, and a longitudinal axis extending between the upper and lower ends, and a base adjacent the lower end of the stem. The guide body is rotatable about the longitudinal axis of the stem to configure the base from an unlocked orientation relative to the wire basket cable tray, in which the base is receivable in and removable from the floor opening of the wire basket cable tray, and a locked orientation relative to the wire basket cable tray, in which the base is secured to the wire basket cable tray in the floor opening.

In another aspect, a cable guide for a cable tray generally comprises a base that is attachable to the cable tray. A stem extends upward from the base and has a longitudinal axis extending between opposite upper and lower ends of the stem. The stem includes a stem body and a snap-fit component that is resiliently deflectable relative to the stem body. A roller is sized and shaped to be slidably received on the stem body and to be rotatable relative to the stem body about the longitudinal axis of the stem. The snap-fit component is configured to attach a roller retainer to the stem body by snap-fit connection when the roller is received on the stem body to retain the roller on the stem body.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
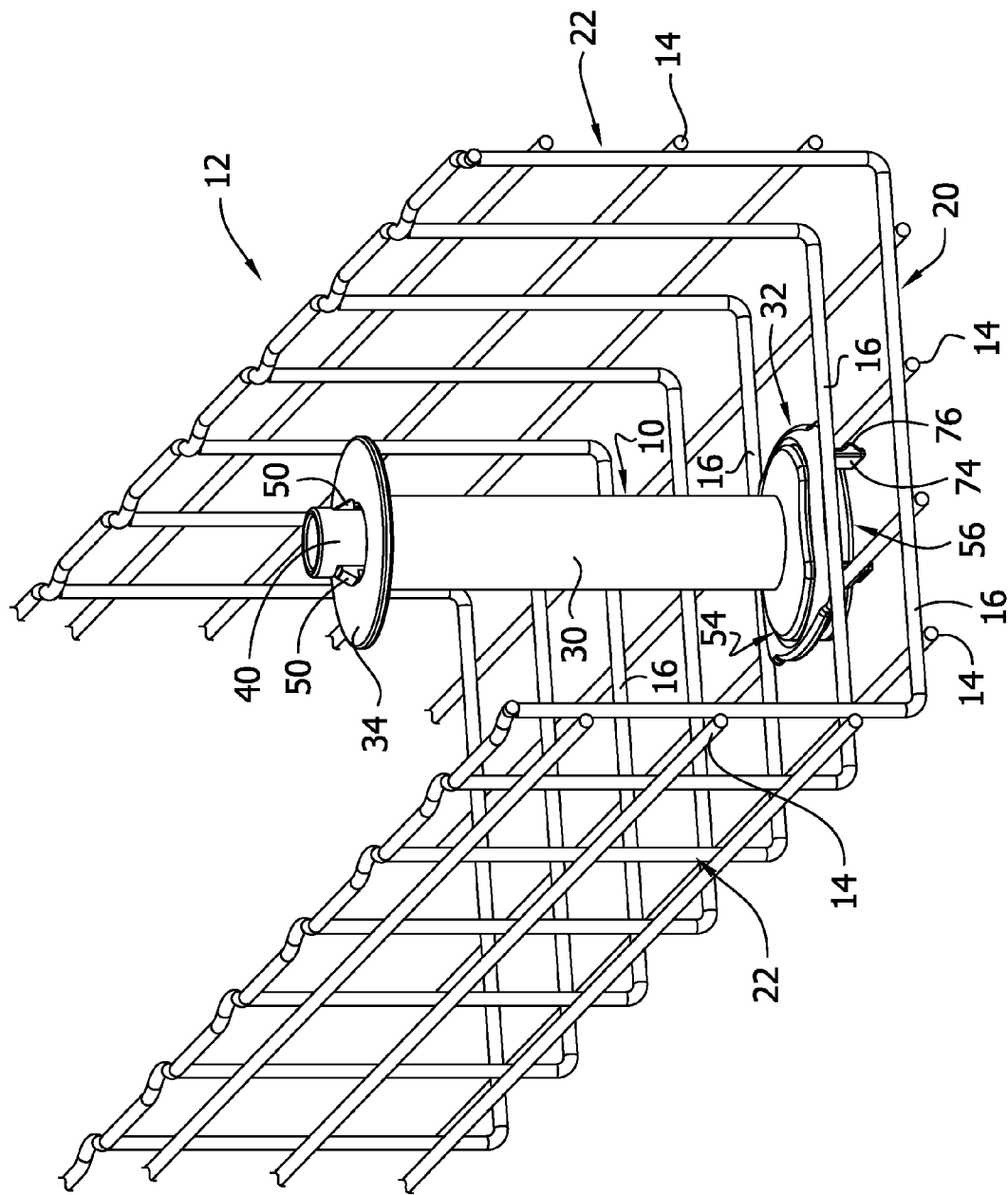
FIG. 1 is a perspective of a cable guide of the present disclosure attached to a wire basket cable tray.
Figure 2:
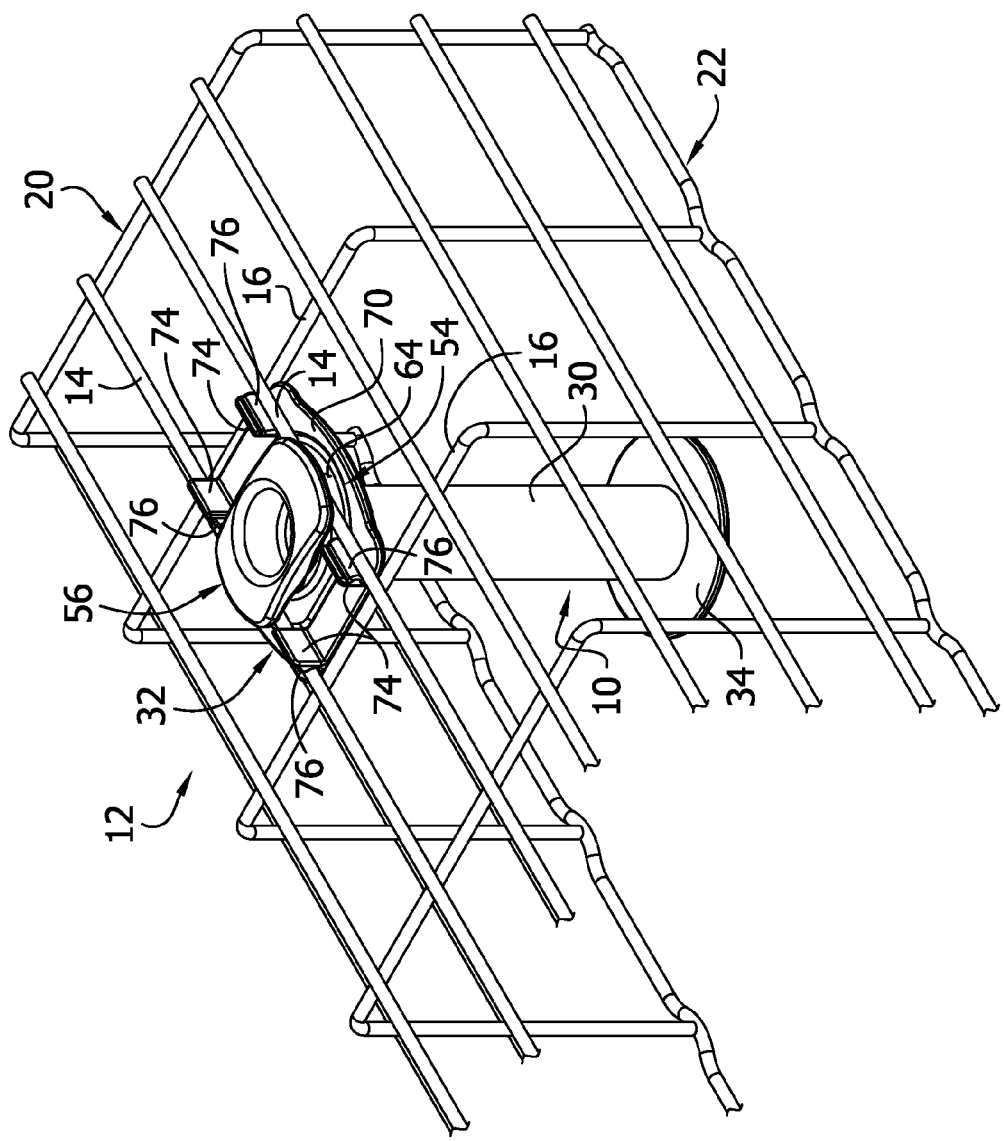
FIG. 2 is a bottom perspective of FIG. 1.

Referring to FIGS. 1 and 2 of the drawings, a cable guide, generally indicated at reference numeral 10, is attached to a wire basket cable tray, generally indicated at reference numeral 12. The cable guide 10 is used to guide cables or wires (not shown) along the wire basket cable tray 12, particularly around corners or other bends along the run of the cable tray. As explained in more detail below, the cable guide 10 is readily attachable to the wire basket cable tray 12 without the use of additional tools or fasteners.

Figure 3:
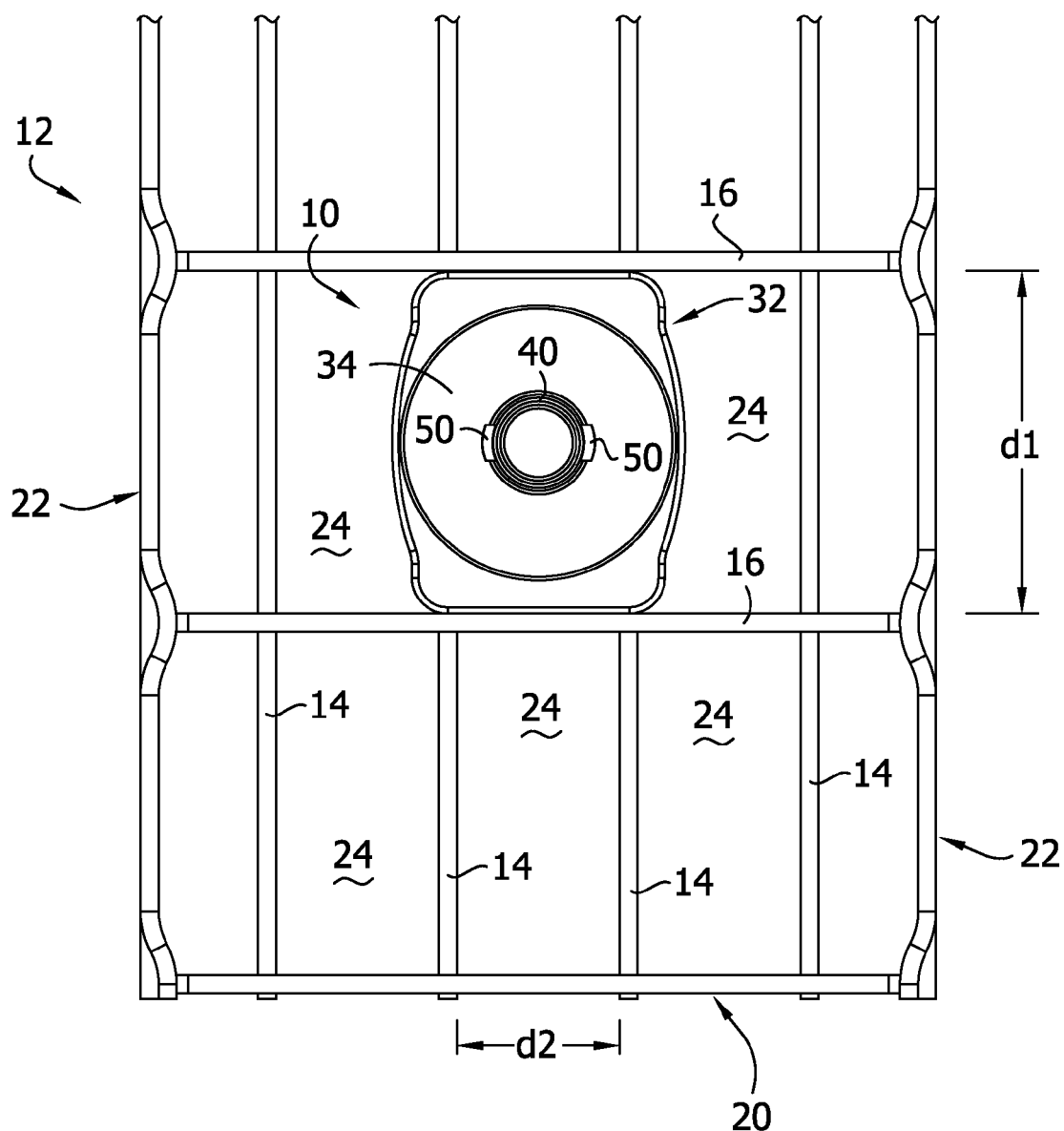
FIG. 3 is a top plan of FIG. 1.

Referring to FIG. 3, the wire basket cable tray 12 includes a plurality of longitudinal wires 14 extending along a length of the cable tray, and a plurality of transverse wires 16 secured to the longitudinal wires and extending generally transverse to the longitudinal wires. In the illustrated embodiment, the transverse wires 16 are secured on upper portions of the longitudinal wires 14, although the transverse wires may be secured to the lower portions of the longitudinal wires in other embodiments or the wires may be interlaced by weaving. The assembly of the wires 14, 16 forms a floor, generally indicated at 20, and opposing side walls of the tray, generally indicated at 22. Adjacent longitudinal wires 14 are parallel to and spaced apart from one another in the transverse direction, and adjacent transverse wires 16 are parallel to and spaced apart from one another in the longitudinal direction so as to form rectangular tray openings 24 in the wire basket cable tray 12. Each tray opening 24 has a longitudinal dimension d1 measured between adjacent transverse wires 16, and a transverse dimension d2 measured between adjacent longitudinal wires 14. These tray openings 24 may be generally uniform, at least at the floor 20 of the cable tray 12 (i.e., the tray floor openings).

Figure 4:
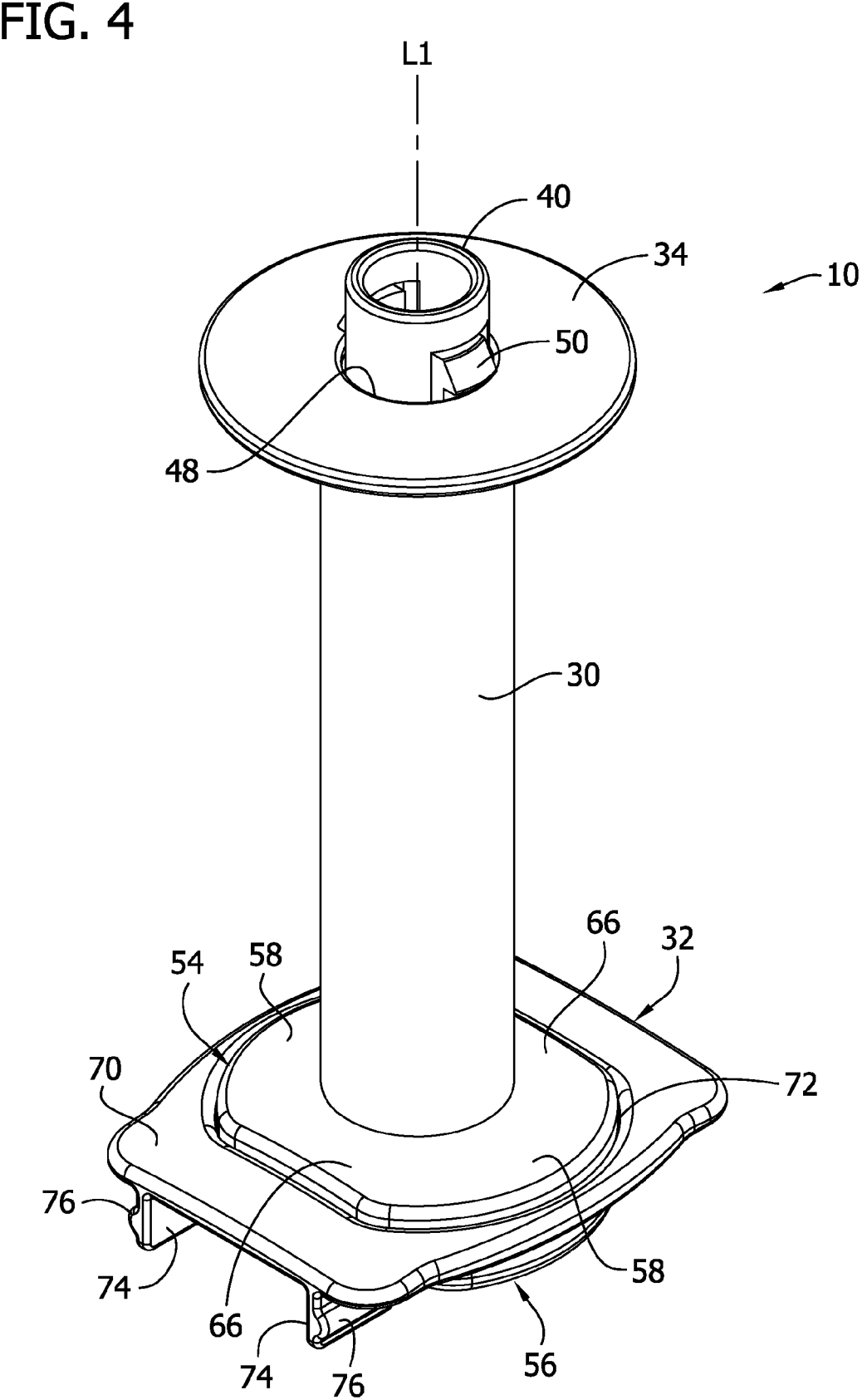
FIG. 4 is a perspective of the cable guide.
Figure 5:
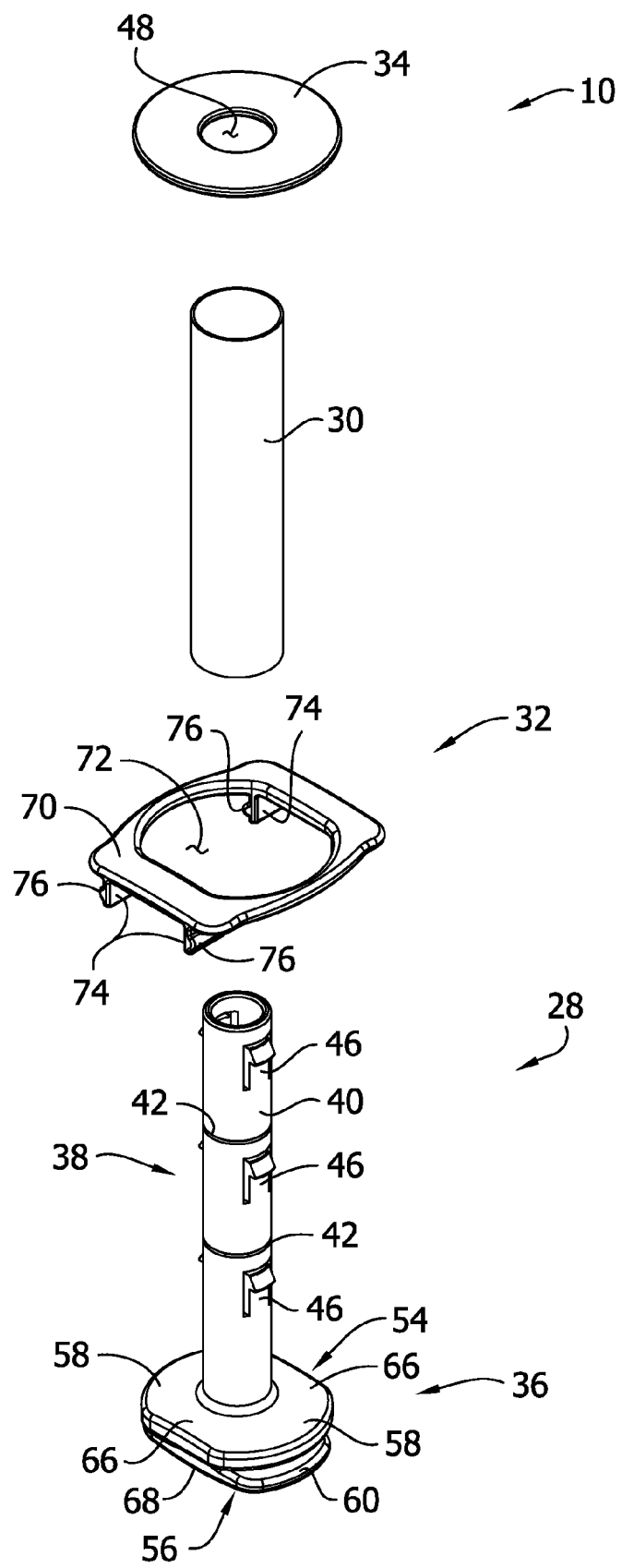
FIG. 5 is an exploded perspective of the cable guide.

Referring to FIGS. 4 and 5, the cable guide 10 comprises a guide body, generally indicated at reference numeral 28 (FIG. 5), a roller 30, a guide body retainer, generally indicated at reference numeral 32, and a roller retainer 34. The guide body 28 includes a base, generally indicated at 36, and a stem, generally indicated at 38, extending upward from the base and having a longitudinal axis L1. In the illustrated embodiment, the guide body 28 is a one-piece, integrally formed component. The guide body 28 may be formed from plastic (e.g., UL 94 rated PVC), such as by injection molding or 3D printing (also known as additive manufacturing). The stem 38 comprises a hollow and generally cylindrical stem body 40, although the stem body may have other shapes and configurations without departing from the scope of the present invention. In the illustrated embodiment, the length of the stem 38 is adjustable. In particular, longitudinal sections of the illustrated stem body 40 are removable from the stem 38 and the guide body 10 for decreasing or shortening the length of the stem. Lines or areas of weakness 42 may be formed in the stem body 40 to facilitate selective removal of one or more longitudinal sections of the stem body. In the illustrated embodiment, the lines or areas of weakness 42 are grooves (e.g., annular grooves) formed in the stem body 40 to facilitate removal of a selected one of the longitudinal sections. The grooves 42 also (or alternatively) function as indicia to indicate the locations where the stem body 40 may be broken and/or cut to adjust the length of the stem 38. In other embodiments, the lines or areas of weakness may be perforations. Other ways of facilitating adjustment of the length of the stem 38 do not depart from the scope of the present invention.

The illustrated roller 30 comprises a cylindrical tube having a relatively thin wall. The roller 30 may be formed from plastic or metal or other material, and may be generally rigid. The illustrated roller retainer 34 comprises a flat washer (e.g., a cylindrical washer), which may be formed from plastic or metal or other material, and may be generally rigid. At least one snap-fit component 46 is connected to and extends outward from the outer surface of the stem body 40 for use in attaching the roller retainer 34 to the stem 38, which in turn, secures the roller to the stem. In the illustrated embodiment, the at least one snap-fit component 46 comprises plurality of sets (e.g., pairs) of snap-fit components that are spaced apart from adjacent sets (e.g., pairs) of snap-fit components along the length of the stem body 40. In particular, one set of snap-fit components 46 is associated with each longitudinal section so that the roller retainer 34 can still be attached to the stem 38 if any of the longitudinal sections are removed.

Figure 7:
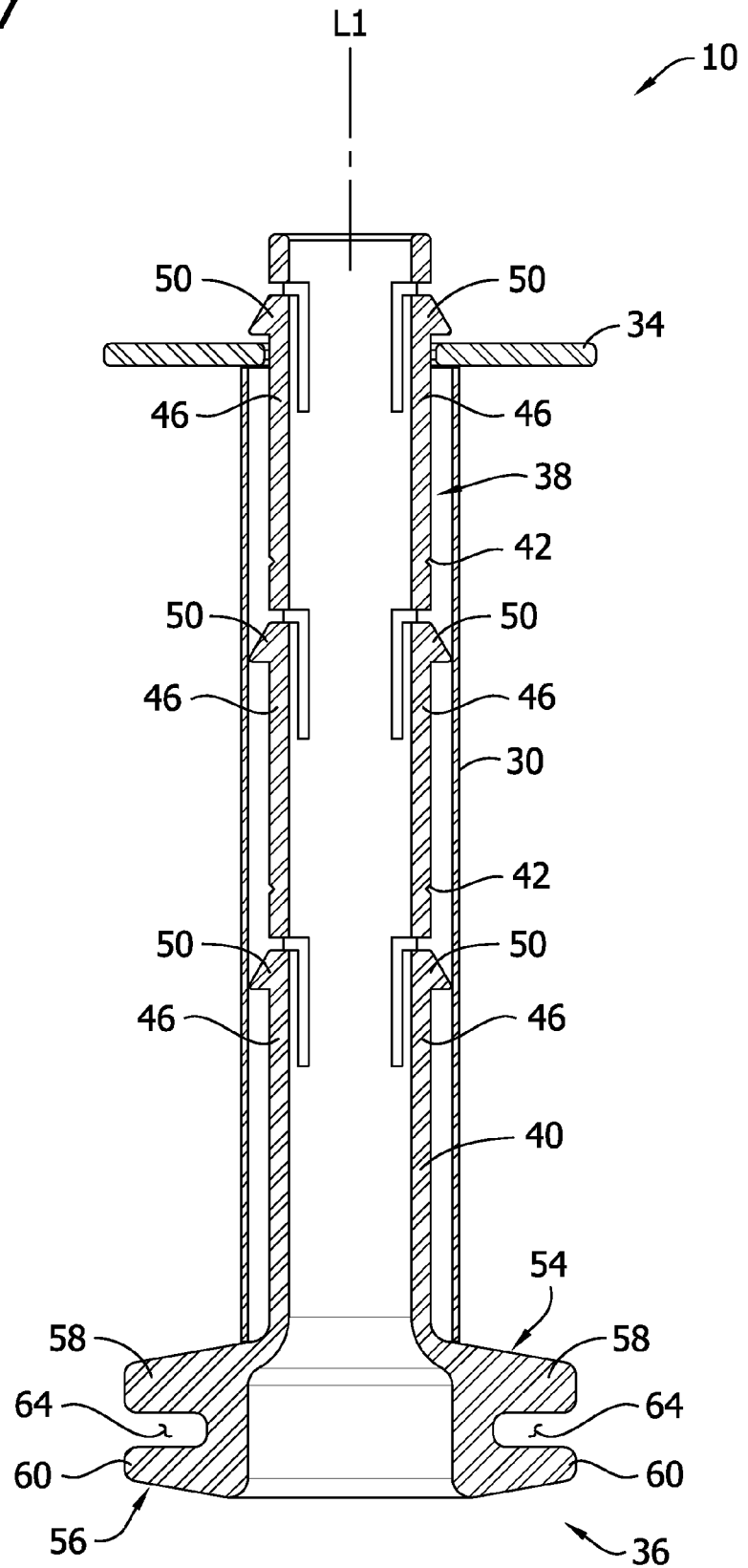
FIG. 7 is a sectional view taken through the plane 7-7 in FIG. 6.

In the illustrated embodiment, each pair of snap-fit components 46 comprises cantilevered lugs that are generally diametrically opposed to one another on the stem body 40 and resiliently deflectable inward relative to the stem body. To attach the roller 30 to the stem 38, the roller is slid downward on the stem body 40, and then the roller retainer 34 is slid downward on the stem body (e.g., an upper end of the stem body is received in an opening 48 in the roller retainer). The opening 48 in the roller retainer 34 is sized and shaped such that the roller retainer engages heads 50 (e.g., hooks) of the cantilevered lugs 46 to radially deflect the lugs inward. When the roller retainer 34 moves past the lug heads 50, the cantilevered lugs 46 rebound such that the lug heads move over the roller retainer, whereby the roller retainer is captured between the lug heads and the upper end of the roller 30, as shown in FIGS. 4 and 7. The snap-fit components 46 may be of other types, designs and configurations for use in attaching the roller 30 to the stem 38. When attached to the stem 38, the roller 30 is rotatable relative to the stem (and the guide body 28) generally about the longitudinal axis L1 of the stem. The roller 30 may be removed from the stem 38 by resiliently deflecting the corresponding cantilevered lugs 46 inward, such as by pinching the opposed lug heads 50, and then lifting the roller upward and over the deflected lug heads.

Figure 6:
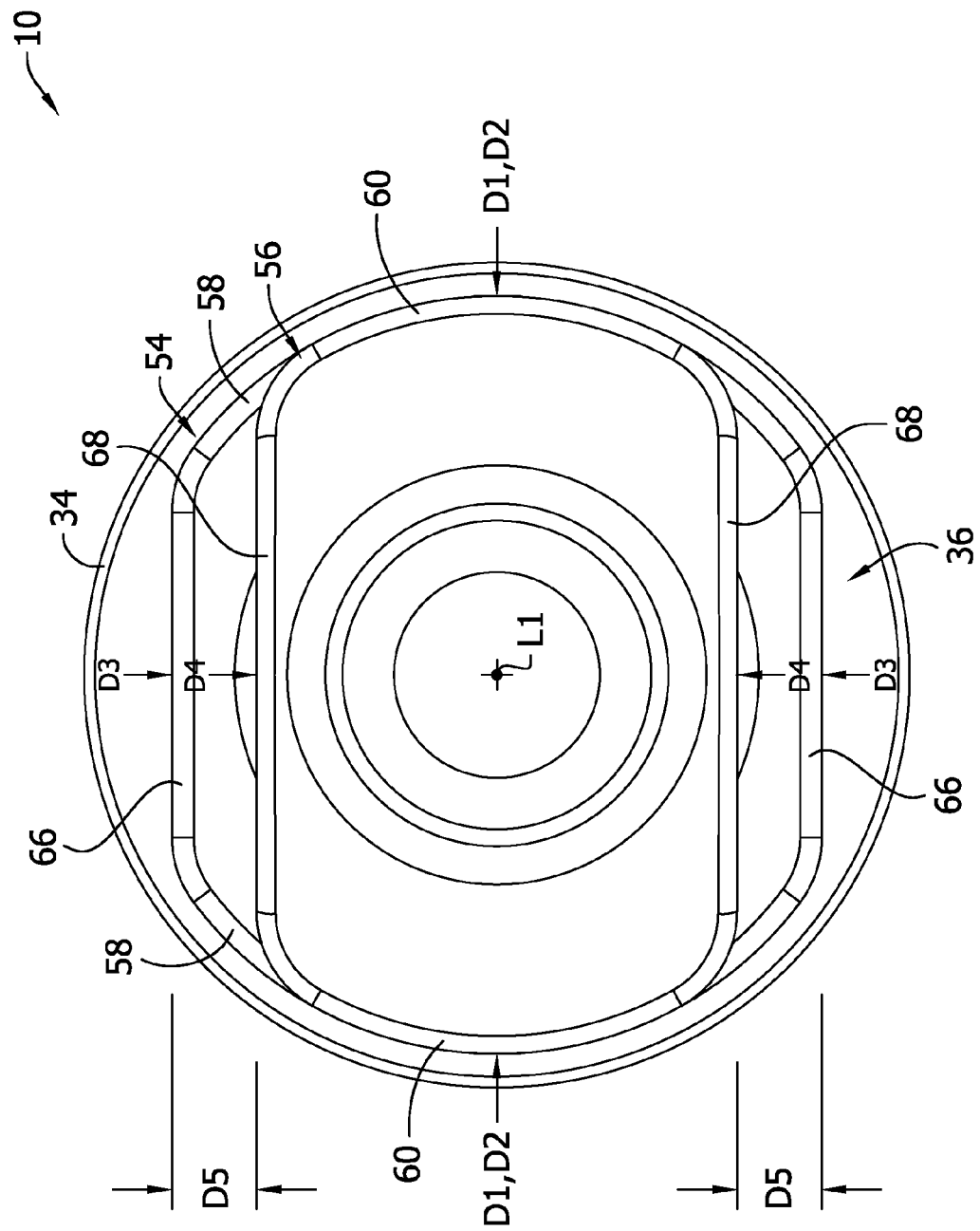
FIG. 6 is a bottom plan of the cable guide, a guide body retainer being removed.

The base 36 of the guide body 28 is configured for attachment to the wire basket cable tray 12. The illustrated base 36 includes an upper flange, generally indicated at reference numeral 54, and a lower flange, generally indicated at reference numeral 56, extending laterally outward from a lower portion of the stem 38. Referring to FIG. 6, the upper flange 54 and the lower flange 56 have opposite flange end portions 58, 60, respectively, and first dimensions (e.g., longitudinal dimensions or lengths) D1, D2, respectively, extending between the flange ends thereof. As shown in FIG. 7, corresponding flange end portions 58, 60 of the upper and lower flanges 54, 56, respectively, are spaced apart along the longitudinal axis L1 of the stem 38 so as to define opposite wire-receiving slots 64 therebetween that are sized and shaped for receiving adjacent wires (e.g., longitudinal wires 14 of the wire basket cable tray 12, as explained in more detail below. The flange end portions 58, 60 are rounded, although they may have other shapes. Referring again to FIG. 6, the upper flange portion 54 and the lower flange portion 56 also have opposite flange side portions 66, 68, respectively, and second dimensions (e.g., transverse dimensions or widths) D3, D4, respectively, extending between the flange sides thereof. The flange side portions 66, 68 are offset about 90 degrees from the flange end portions 58, 60 about the longitudinal axis L1 of the stem 38. The flange side portions 66, 68 are generally truncated or squared.

Figure 8:
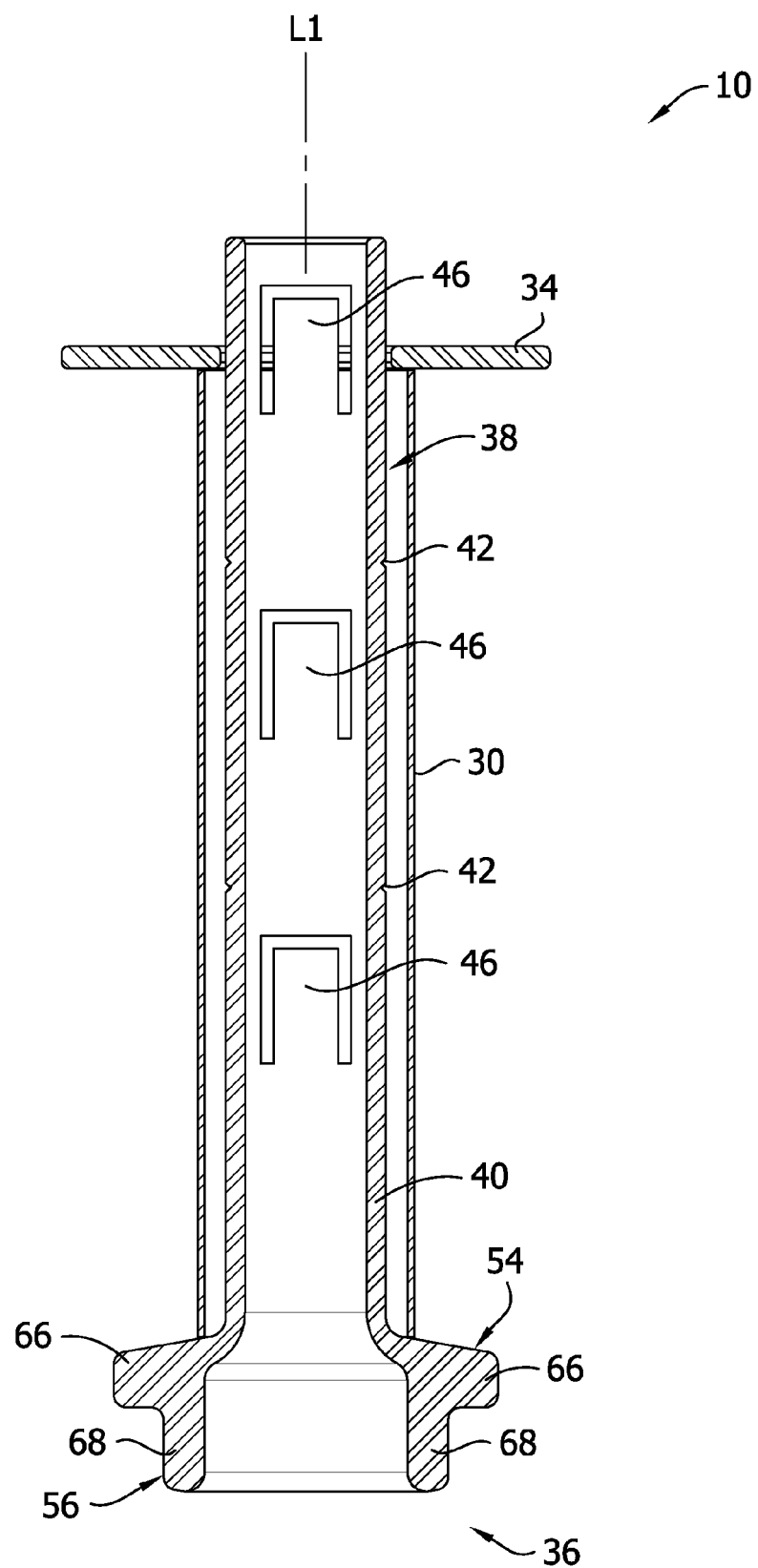
FIG. 8 is a sectional view taken through the plane 8-8 in FIG. 6.

Referring to FIGS. 6 and 8, the first dimensions D1, D2 of the upper and lower flange portions 54, 56, respectively, are greater than the respective second dimensions D3, D4. Moreover, in the illustrated embodiment the first dimensions D1, D2 are generally equal, although one may be greater than the other so long as the flange end portions 58, 60 define the wire-receiving slots 64 therebetween. As an example, the first dimensions D1, D2 may be from about 60 mm to about 90 mm. The second dimension D3 of the upper flange 54 is greater than the second dimension D4 of the lower flange 56 such that the flange side portions 66 of the upper flange extend laterally beyond the flange side portions 68 of the lower flange. As an example, the second dimension D3 of the upper flange 54 may be greater than 50 mm, and the second dimension D4 of the lower flange 56 may be less than 50 mm. In one example, the flange side portions 66 of the upper flange 54 may extend laterally beyond the flange side portions 68 of the lower flange 56 distances D5 from about 10 mm to about 20 mm.

Figure 9:
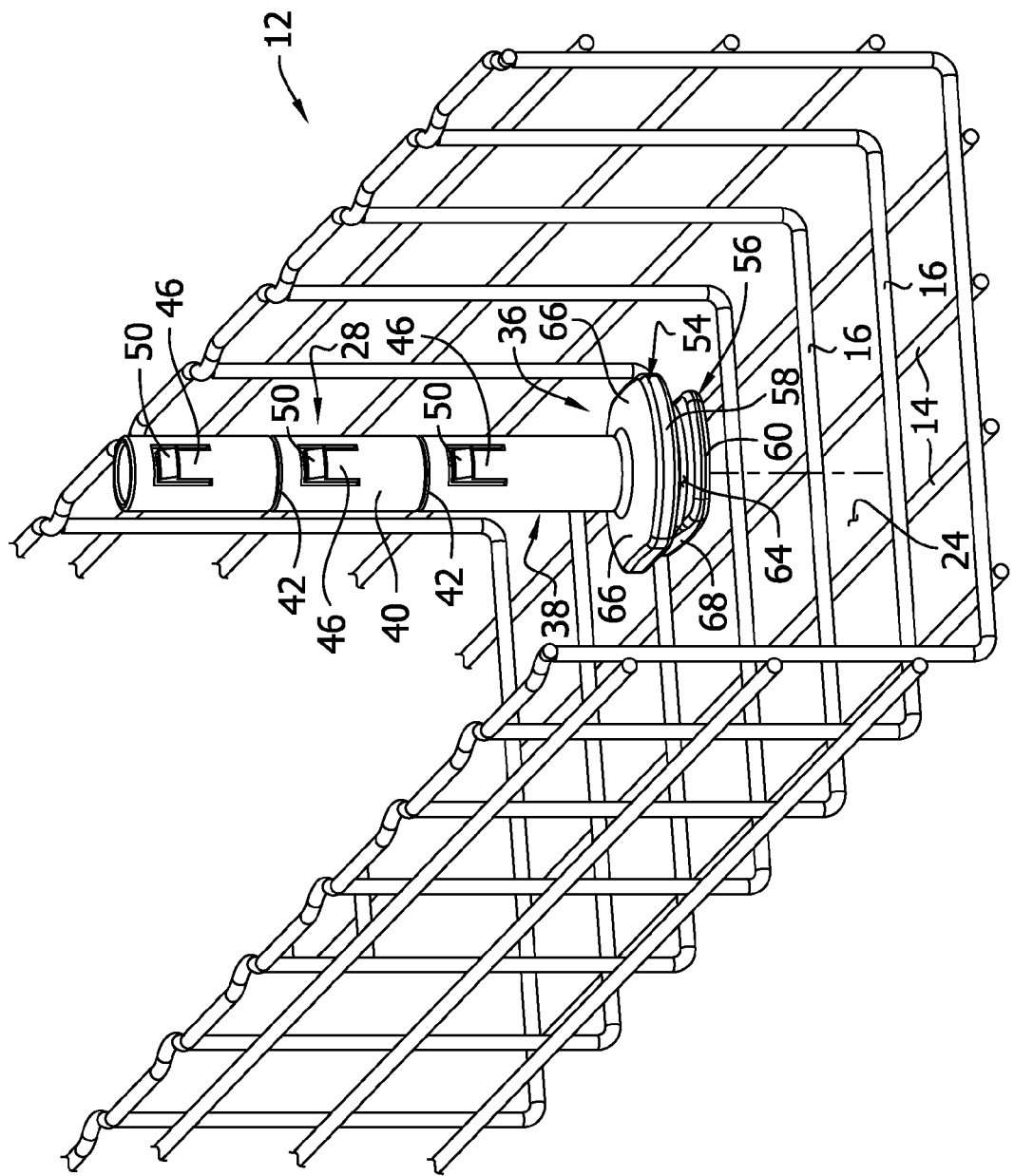
FIG. 9 is a perspective of a guide body in an unlocked orientation being inserted into a tray opening of the wire basket cable tray.
Figure 10:
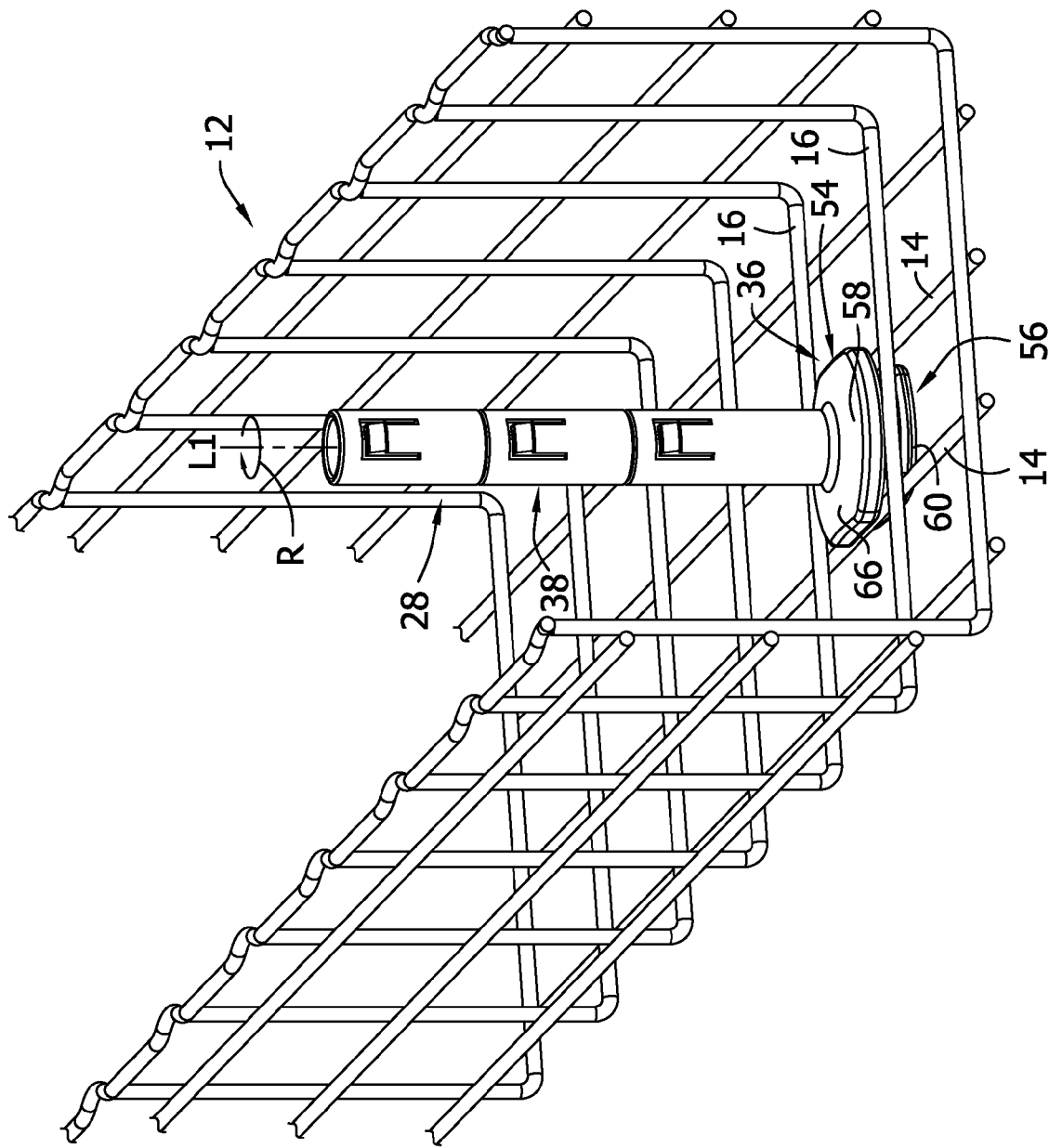
FIG. 10 is similar to FIG. 9, with the guide body received in the tray opening in the unlocked orientation.

Referring to FIG. 9, the base 36 of the guide body 28 is shown being inserted into a selected tray opening 24 in an unlocked orientation (broadly, a first orientation) in which the first dimensions D1, D2 of the upper and lower flanges 54, 56 extend lengthwise of the cable tray 12, and the second dimensions D3, D4 of the upper and lower flanges extend transversely relative to the cable tray. The first dimensions D1, D2 of the upper and lower flanges 54, 56 are less than the longitudinal dimensions d1 of the tray floor openings 24, the second dimension D4 of the lower flange is less than the transverse dimensions d2 of the tray floor openings, and the second dimension D3 of the upper flange is greater than the transverse dimensions of the tray floor openings. Accordingly, when the base 36 of the guide body 28 is in the unlocked orientation shown in FIG. 10, the upper and lower flanges 54, 56 are receivable between adjacent transverse wires 16 of the cable tray 12, the lower flange is receivable between adjacent longitudinal wires 14 of the cable tray, and the upper flange is not receivable between adjacent longitudinal wires of the cable tray. As shown in FIG. 10, when inserted in the tray opening in the unlocked orientation, the lower flange 56 is disposed below an underside of the tray (e.g., below the adjacent longitudinal wires 14), and the upper flange 54, more specifically the end portions 66 thereof, engages the adjacent longitudinal wires and is received between the adjacent transverse wires 16.

Figure 11:
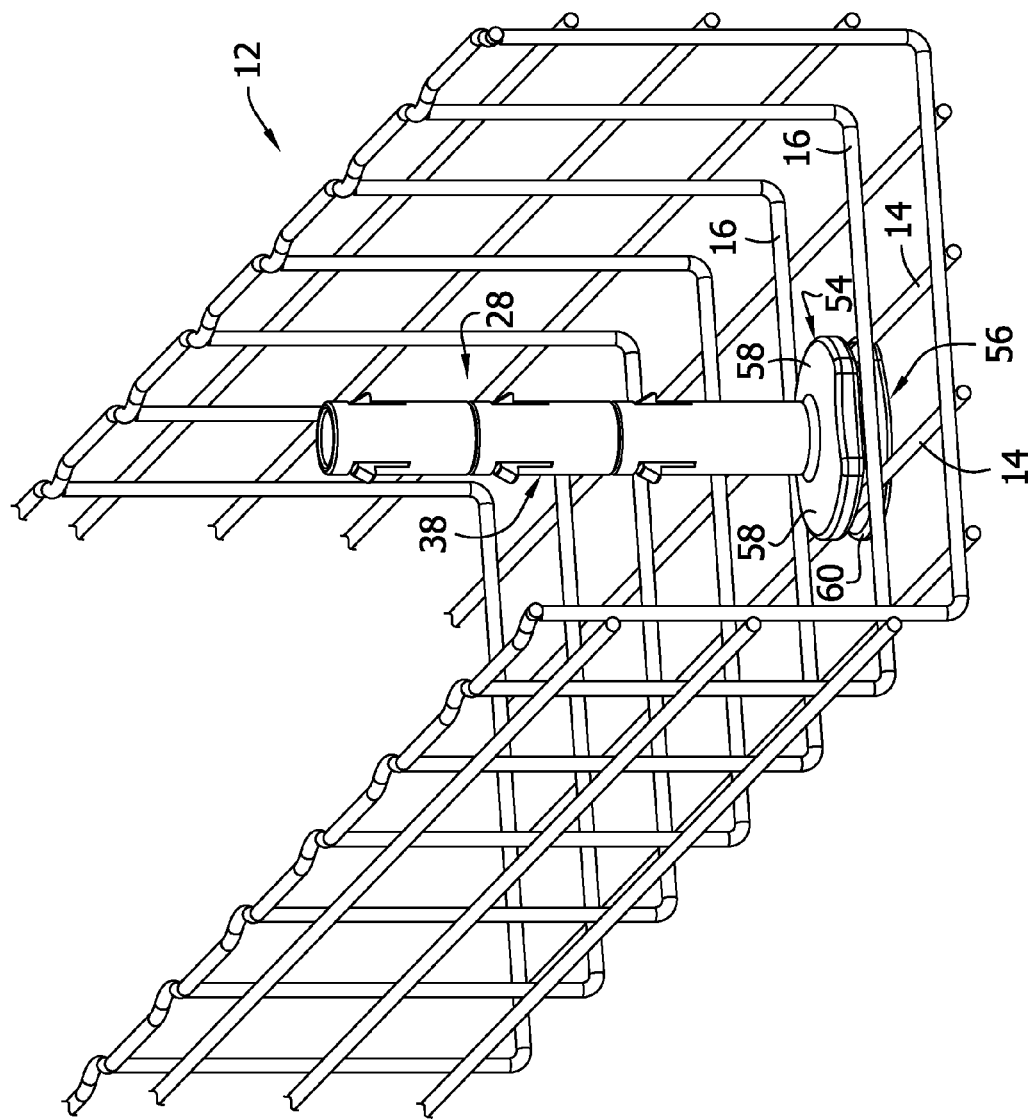
FIG. 11 is similar to FIG. 10, with the guide body in a locked orientation in the tray opening.

With the guide body 28 received in the selected tray opening 24 in the unlocked orientation, as shown in FIG. 10, the guide body is rotated about 90 degrees about the longitudinal axis L1 of the stem 38, as indicated by arrow R, to a second or locking orientation, as shown in FIG. 11. As the guide body 28 rotates, the adjacent longitudinal wires 14 enter the respective wire-receiving slots 64 defined between the flange end portions 58, 60 of the respective upper and lower flanges 54, 56, respectively, as shown in FIG. 11. In one embodiment, the wire-receiving slots 64 are sized and shaped to snugly receive wires having a diameter of 5 mm to limit upward and downward play between the base 36 and the cable tray 12, and can also receive wires having smaller diameters, such as a diameter of 4.5 mm. In the locking orientation, the adjacent longitudinal wires 14 are received in the wire-receiving slots 64 and the guide body 28 is inhibited from disengaging from the cable tray 12, unless the guide body is counter-rotated 90 degrees to the unlocked orientation. It is understood that the base 36 may be configured to receive (e.g., lock onto) the transverse wires 16, rather than the longitudinal wires 14, or the base may be configured to receive (e.g., lock onto) both the longitudinal wires and the transverse wires.

Figure 12:
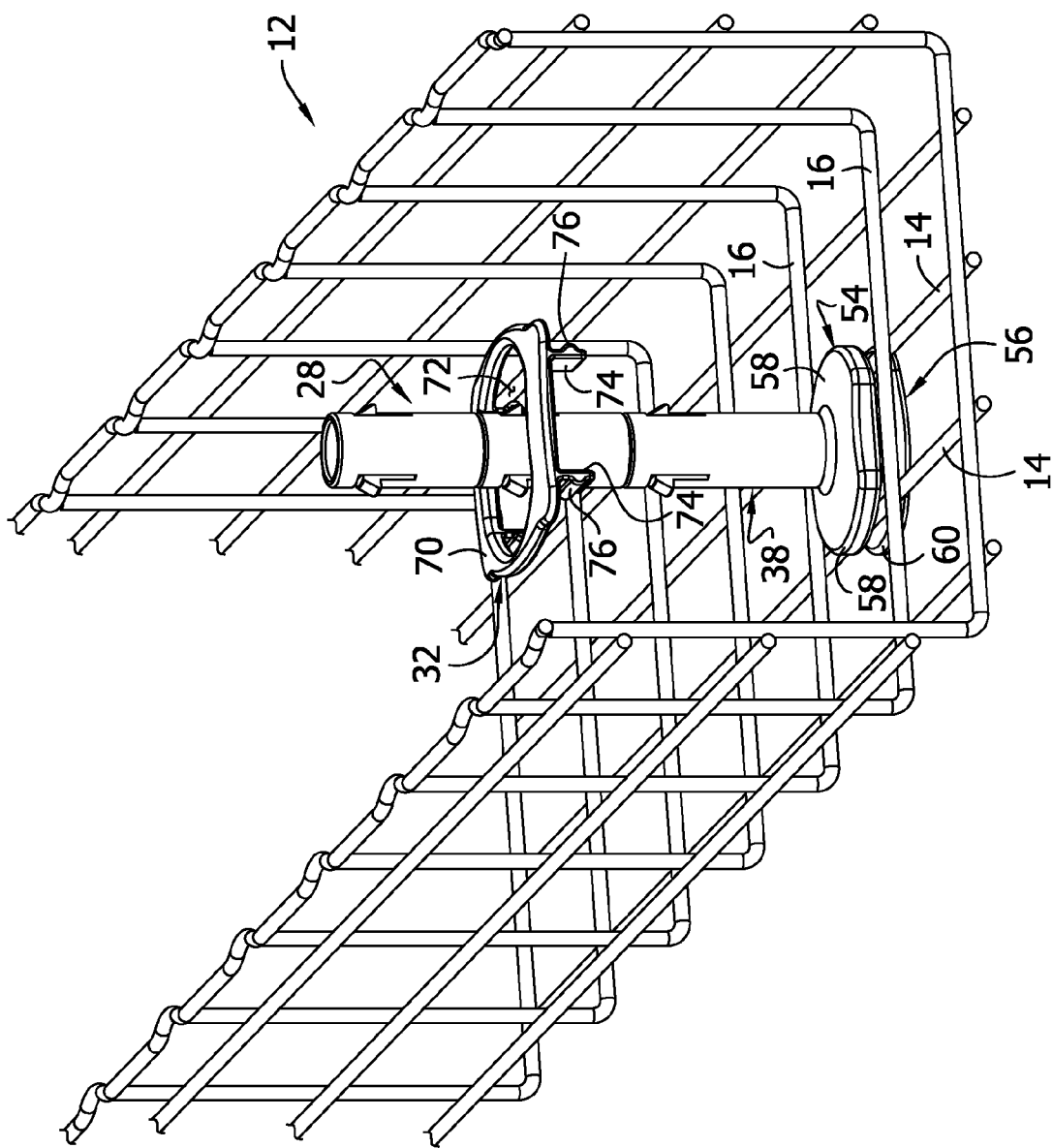
FIG. 12 is similar to FIG. 11, with a guide body retainer received on a stem of the guide body.
Figure 13:
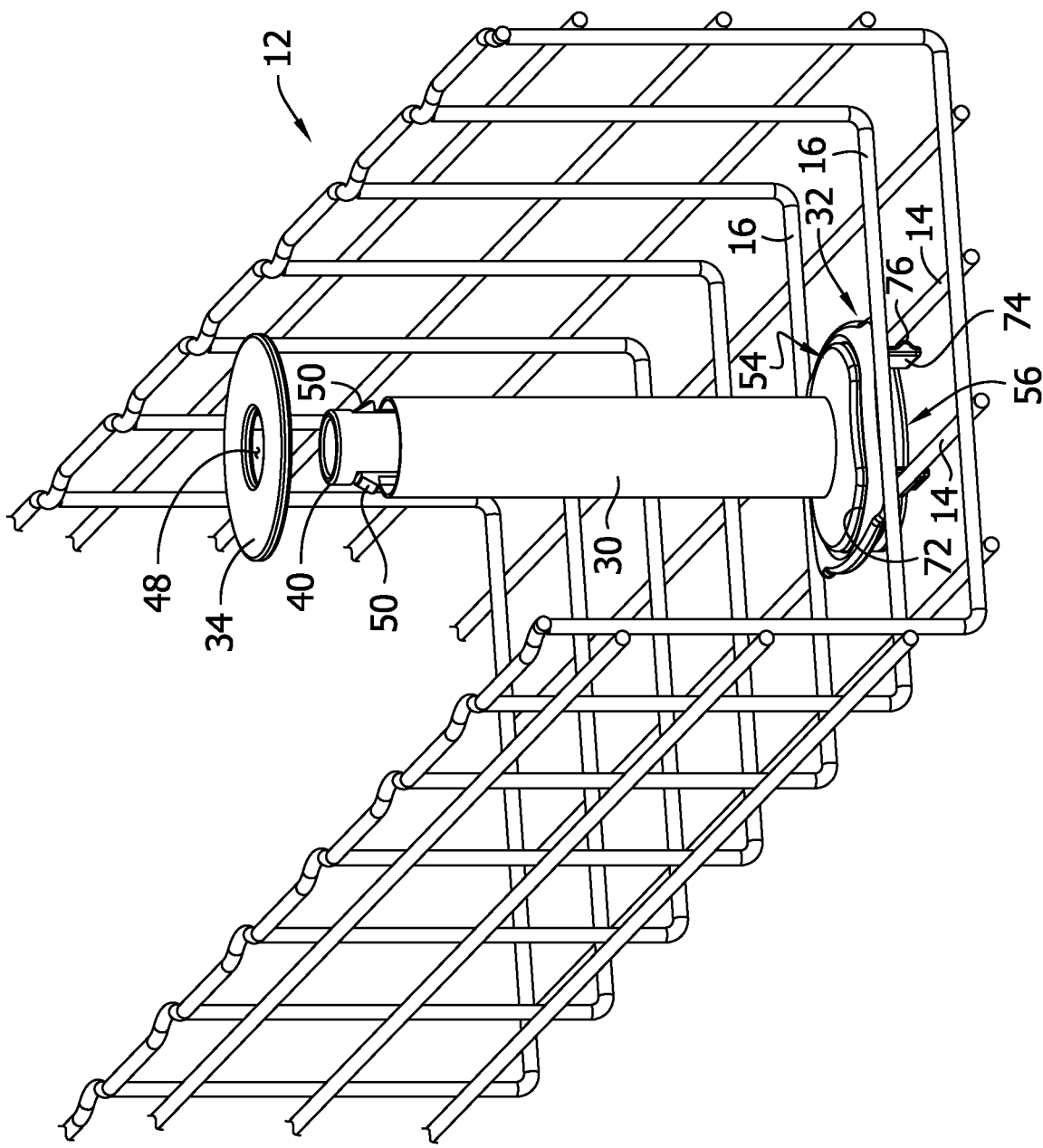
FIG. 13 is similar to FIG. 12, with a roller received on the stem of the guide body and a roller retainer being received on the stem of the guide body.

Referring to FIGS. 12 and 13, the guide body retainer 32 is used to inhibit guide body 28 from counter-rotating on the cable tray 12 from the locked orientation (FIG. 11) to the unlocked orientation (FIG. 12). The guide body retainer 32 has a retainer body 70 generally in the form of a plate. The retainer body 70 defines a retainer opening 72 having a generally complementary shape and size to the upper flange 54 of the base 36 such that the upper flange is snugly receivable in the retainer opening when the guide body retainer 32 is in the orientation shown in FIG. 12. Tray-connecting projections 74 extend downward from a lower side of the retainer body 70. In the illustrated embodiment, the tray-connecting projections 74 comprise snap-fit components configured for snap-fit connection to the cable tray 12. The snap-fit components 74 comprise lugs that are resiliently deflectable (e.g., cantilevered) relative to the retainer body and include lug heads 76 (e.g., beads).

In use the guide body retainer 32 is slid down on the stem 38 toward the floor 20 of the tray 12 such that the retainer opening 72 is aligned with the upper flange 54 of the base 36. The guide body retainer 32 is pressed downward so that the lug heads 76 of the lugs 74 engage the adjacent longitudinal wires 14 and the lugs resiliently deflect inward into the tray opening 24. The lug heads 76 pass below the adjacent longitudinal wires 14 and the lugs 74 rebound, whereby the adjacent longitudinal wires are captured between a lower face of the retainer body 70 and the lug heads 76. When the guide body retainer 32 is connected to the cable tray 12, as shown in FIG. 13, the upper flange 54 is received in the retainer opening 72, so as to inhibit the guide body 28 from rotating about the longitudinal axis L1 of the stem 38 or otherwise moving relative to the guide body retainer. Sides of the retainer body 70 are snugly received between the adjacent transverse wires 16 of the cable tray 12, so as to inhibit the guide body retainer (and the guide body 28) from rotating about the longitudinal axis L1 of the stem 38 or otherwise moving relative to the cable tray. In this way, the guide body 28 is fixedly secured to the cable tray 12. In the illustrated embodiment, the lug heads 76 are rounded to allow the guide body retainer 32 to be selectively removed from the cable tray 12, thus allowing the guide body 28 to be removed from the tray, if a sufficient upward force is applied to the guide body retainer so that the lugs 74 deflect and the lug heads 76 move upward above the cable tray. The retainer 32 may be of other configurations, and the guide body 28 may be attached to the cable tray 12 in other ways.

The steps involved in one exemplary method of installing the cable guide 10 are shown in FIGS. 9-13. Prior to installing the cable guide 10, the length (e.g., height) of the stem body 40 may be adjusted (e.g., shortened) to accommodate the height of the cable tray 12. In one example, one or more of the longitudinal portions of the stem body 40 may be removed by breaking or cutting the stem body along a selected one of the annular grooves 42. After selecting the length of the stem body 40, which includes not removing a longitudinal portion of the stem body, the base 36 of the guide body 28 is orientated in the unlocked orientation and inserted into a selected one of tray openings 24, as shown in FIGS. 9 and 10 and described above. The guide body 28 is then rotated 90 degrees about the longitudinal axis L1 of the stem 38, such as by rotating the stem body about the axis, to orientate the base in the locked orientation, whereby the longitudinal wires 14 enter the wire-receiving slots 64 of the base 36, as shown in FIGS. 10 and 11. After orientating the base 36 in the locked orientation, the guide body retainer 32 is attached (e.g., snap-fit) to the cable tray 12, in the manner described above and shown in FIGS. 12 and 13, to retain the base 36 in the locked orientation and secure the guide body 28 to the cable tray. With the guide body 28 secured to the cable tray 12, the roller 30 is slid over the stem 38, and then the roller retainer 34 is attached (e.g., snap-fit) to the stem, in the manner described above and shown in FIG. 13, to retain the roller on the stem such that the roller is rotatable relative to the stem about the longitudinal axis L1 of the stem. With the cable guide 28 installed on the cable tray 12, wires or cables (not shown) can be run along the length of the cable tray and in engagement with the roller 30 of the cable guide 10. The wires or cables are retained between the base 36 of the cable guide body 28 (and the guide body retainer 32) and the roller retainer 34.

The steps of installing the cable guide 10 may be different than given above and/or the cable guide may be installed in other ways. For example, the cable guide 10 may be at least partially pre-assembled before attaching the cable guide to the cable tray 12. In one embodiment, the roller 30 may be pre-attached to the stem 38 using the roller retainer 34 before installing on the cable tray 12. Moreover, the guide body retainer 32 may be received on the stem 38. In this embodiment, the cable guide 10 is installed on the cable tray 12 in essentially the same way as set forth above, except the roller 30 and/or the guide body retainer 32 are received on the stem 38 before attaching the guide body 28 to the cable tray.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable guide for a wire basket cable tray including adjacent longitudinal wires secured to adjacent and transverse wires to define a floor opening in a floor of the wire basket cable tray, the cable guide comprising:
   a guide body including
      a stem having an upper end, a lower end, and a longitudinal axis extending between the upper and lower ends, and
      a base adjacent the lower end of the stem, the guide body being rotatable about the longitudinal axis of the stem to configure the base from an unlocked orientation relative to the wire basket cable tray, in which the base is receivable in and removable from the floor opening of the wire basket cable tray, and a locked orientation relative to the wire basket cable tray, in which the base is secured to the wire basket cable tray in the floor opening,
   wherein the base defines at least one wire-receiving slot sized and shaped to receive at least one of the wires of the wire basket cable tray when the base is in the locked orientation relative to the wire basket cable tray, wherein the at least one wire-receiving slot extends laterally inward from an exterior of the base toward the longitudinal axis of the stem.

2. The cable guide set forth in claim 1, wherein the at least one wire-receiving slot comprises two wire-receiving slots configured to receive one of the adjacent longitudinal wires and the adjacent transverse wires of the wire basket cable tray when the base is in the locked orientation relative to the wire basket cable tray.

3. The cable guide set forth in claim 2, wherein the base comprises upper and lower flanges extending radially outward relative to the longitudinal axis of the stem and having opposite flange end portions defining the two wire-receiving slots.

4. The cable guide set forth in claim 3, wherein the upper flange has opposite flange side portions extending radially beyond the lower flange relative to the longitudinal axis of the stem.

5. The cable guide set forth in claim 1, wherein the unlocked orientation of the base is offset 90 degrees from the locked orientation relative to the longitudinal axis of the stem.

6. The cable guide set forth in claim 1, wherein the guide body is a single, one-piece, integrally formed component.

7. The cable guide set forth in claim 6, wherein the guide body is formed from a plastic material.

8. The cable guide set forth in claim 1, further comprising a roller sized and shaped to be slidably received on the stem and to be rotatable relative to the stem about the longitudinal axis of the stem when received on the stem.

9. The cable guide set forth in claim 1, wherein the stem comprises a stem body extending along the stem and a snap-fit component that is resiliently deflectable relative to the stem body, wherein the snap-fit component is configured to attach, by snap-fit connection, a roller retainer to the stem to retain the roller on the stem.

10. The cable guide set forth in claim 1, further comprising a guide body retainer receivable on the guide body and configured to be selectively attached to the wire basket cable tray to inhibit rotation of the base from the locked orientation to the unlocked orientation.

11. The cable guide set forth in claim 10, wherein the guide body retainer includes a snap-fit component configured to attach the guide body retainer to the wire basket cable tray by snap-fit connection.

12. The cable guide set forth in claim 11, wherein the guide body retainer includes a retainer body defining a retainer opening sized and shaped to receive the base of the guide body.

13. The cable guide set forth in claim 12, wherein the snap-fit component comprises a plurality of snap-fit components extending downward from the retainer body.

14. A cable guide for a cable tray comprising:
   a base that is attachable to the cable tray;
   a stem extending upward from the base and having a longitudinal axis extending between opposite upper and lower ends of the stem, the stem including a stem body and a snap-fit component that is resiliently deflectable inward relative to the stem body;
   a roller sized and shaped to be slidably received on the stem body and to be rotatable relative to the stem body about the longitudinal axis of the stem; and
   a roller retainer sized and shaped to be received on the upper end portion of the stem body and slidable along the longitudinal axis of the stem,
   wherein the snap-fit component is configured to attach the roller retainer to the stem body by snap-fit connection by sliding the roller retainer along the longitudinal axis of the stem and over the snap-fit component to resiliently deflect the snap-fit component inward relative to the stem body when the roller is received on the stem body to retain the roller on the stem body.

15. The cable guide set forth in claim 14, wherein the snap-fit component and the roller are configured to capture the roller retainer between the snap-fit component and an upper end of the roller when the roller is received on the stem body.

16. The cable guide set forth in claim 14, wherein the snap-fit component comprises at least one set of snap-fit components, wherein the snap-fit components in the same set of snap-fit components cooperate to attach the roller retainer to the stem.

17. The cable guide set forth in claim 16, wherein the at least one set of snap-fit components comprises a plurality of sets of snap-fit components, wherein the sets of snap-fit components are spaced apart from one another along the stem body.

18. The cable guide set forth in claim 17, wherein the stem body includes a plurality of longitudinal portions, wherein at least one of the longitudinal portions is removable from the stem to shorten the stem body, wherein each of the plurality of longitudinal portions has one of the sets of snap-fit components associated with it.

19. A cable guide for a wire basket cable tray including adjacent longitudinal wires secured to adjacent and transverse wires to define a floor opening in a floor of the wire basket cable tray, the cable guide comprising:
   a guide body including
      a stem having an upper end, a lower end, and a longitudinal axis extending between the upper and lower ends, and
      a base adjacent the lower end of the stem, the guide body being rotatable about the longitudinal axis of the stem to configure the base from an unlocked orientation relative to the wire basket cable tray, in which the base is receivable in and removable from the floor opening of the wire basket cable tray, and a locked orientation relative to the wire basket cable tray, in which the base is secured to the wire basket cable tray in the floor opening;

a guide body retainer receivable on the guide body and configured to be selectively attached to the wire basket cable tray to inhibit rotation of the base from the locked orientation to the unlocked orientation, wherein the guide body retainer includes a snap-fit component configured to attach the guide body retainer to the wire basket cable tray by snap-fit connection, wherein the guide body retainer includes a retainer body defining a retainer opening sized and shaped to receive the base of the guide body, wherein the snap-fit component comprises a plurality of snap-fit components extending downward from the retainer body.

\* \* \* \* \*